United States Patent

[11] 3,602,525

[72] Inventor Arthur K. Moulton
9569 Ash Creek Drive, Dallas, Tex. 75228
[21] Appl. No. 881,756
[22] Filed Dec. 3, 1969
[45] Patented Aug. 31, 1971

[54] AUTOMOBILE STABILIZER
8 Claims, 4 Drawing Figs.
[52] U.S. Cl. ................................................ 280/150 D
[51] Int. Cl. .................................................. B60r 27/00
[50] Field of Search ................................... 280/150 D, 150 E

[56] References Cited
UNITED STATES PATENTS
2,990,193 6/1961 Heard .......................... 280/150 D Primary Examiner—Leo Friagua
Assistant Examiner—Winston H. Douglas
Attorneys—J. Vincent Martin, Joe E. Edwards and Jack R. Springgate ABSTRACT: A stabilizing device for automobiles including a plurality of inertial elements pivotally mounted in a case as inverted pendulums and means connected to the inertial elements at points below their pivot point to bias such elements toward their upright inverted pendulum position and to transmit forces to said case in the opposite direction to movement of said inertial elements. This abstract is neither intended to define the invention of the application which, of course, is measured by the claims, nor is it intended to be limiting as to the scope of the invention in any way.

PATENTED AUG 31 1971　　　　　　　　　　　　　　　3,602,525
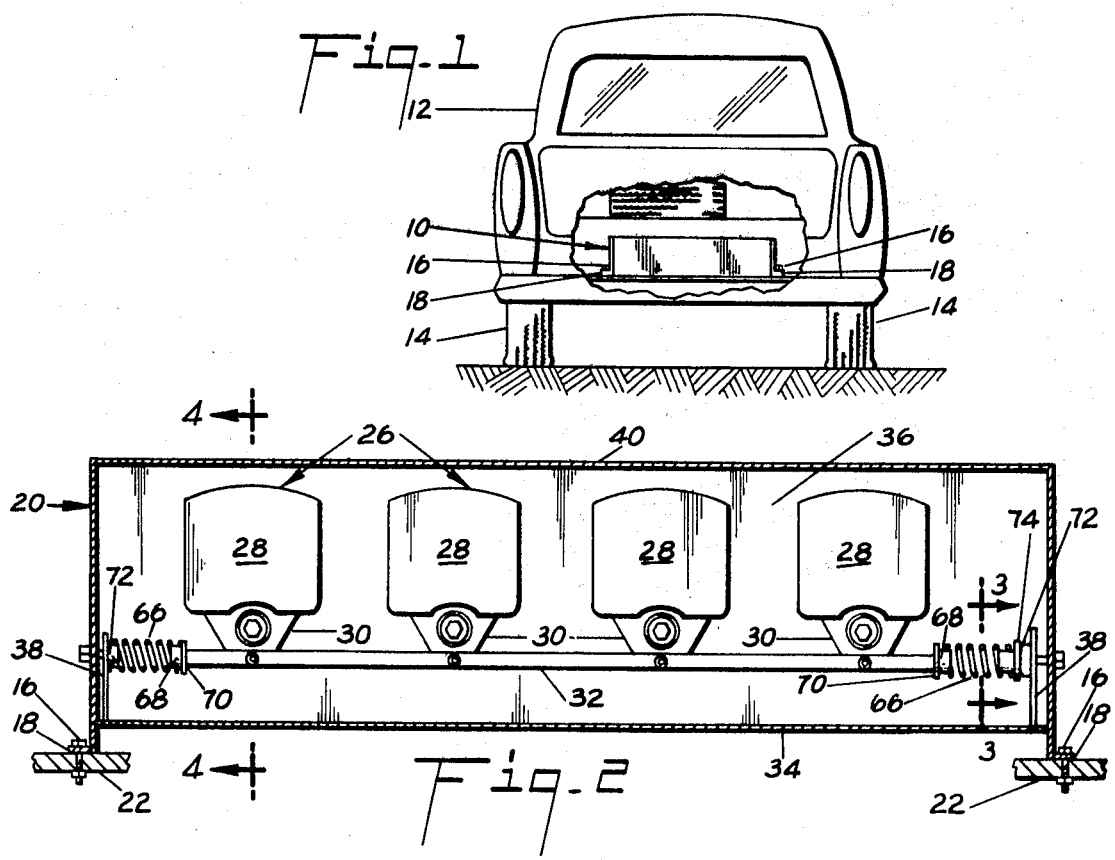
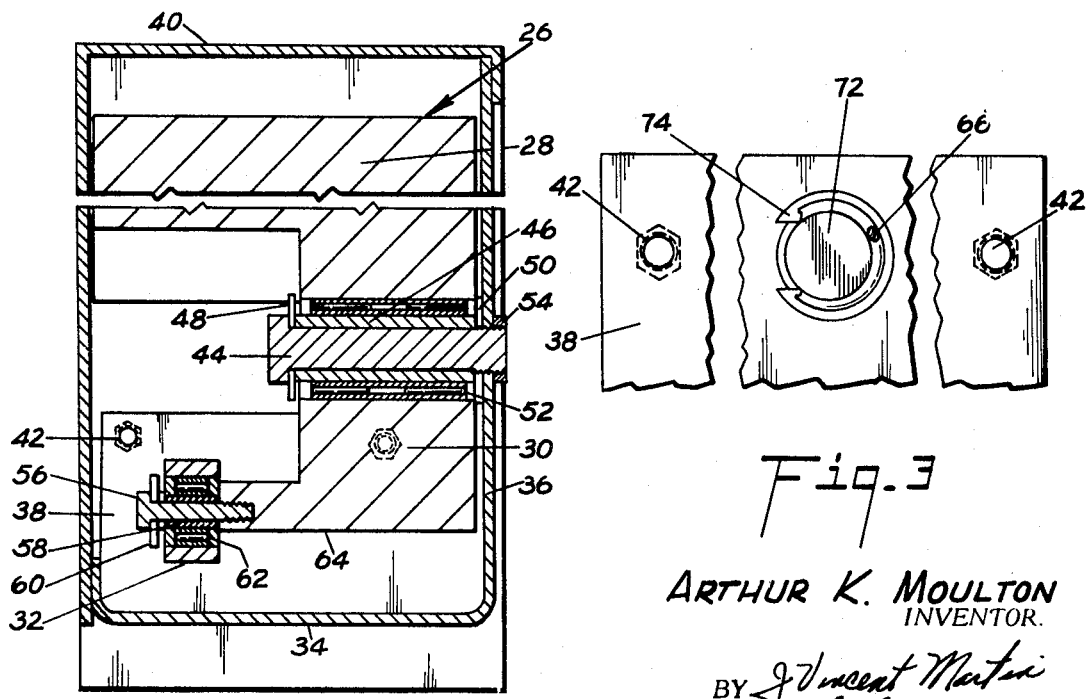
ARTHUR K. MOULTON
INVENTOR.
BY J. Vincent Martin
Joe E. Edwards
Jack R. Springate
ATTORNEYS

AUTOMOBILE STABILIZER

SUMMARY

The present invention relates to an improved automobile stabilizer which functions to prevent skidding on turns by providing a reaction force toward the inside of the turn.

An object of the present invention is to provide an improved automobile stabilizer which is simply made and installed in an automobile.

Another object is to provide an improved automobile stabilizer for preventing skidding in turns which accentuates the forces developed in turning to provide more effective reaction forces.

A further object is to provide an improved automobile stabilizer which develops reaction forces in turns to prevent skidding while causing the center of gravity of the automobile to be lowered.

BRIEF DESCRIPTION OF THE DRAWINGS

These and other objects and advantages of the improved automobile stabilizing device of the present invention are hereinafter set forth and explained with reference to the preferred form of the present invention shown in the drawings wherein:

FIG. 1 is a rear elevation view of an automobile with a portion broken away to show the position of the improved stabilizer in the trunk of the automobile.

FIG. 2 is a sectional view of the improved stabilizer taken in a vertical plane transverse to the automobile.

FIG. 3 is a sectional view taken along line 3—3 in FIG. 2 to illustrate the adjustment of the biasing means.

FIG. 4 is a sectional view taken along line 4—4 in FIG. 2 to show the pivotal mounting of one of the inertial elements and the connection of the biasing means to such element.

DESCRIPTION OF THE PREFERRED EMBODIMENT

The improved stabilizing device 10 of the present invention is preferably secured within the trunk of the car 12 in as low a position as possible and generally centered between the rear wheels 14. Suitable securing means such as the bolts 16 extending through the flanges 18 of case 20 and the floor 22 of the trunk and the nuts 24 which thread onto the bolts 16 below the floor 22 retain the device 10 in its preferred position.

The device 10 includes a plurality of inertial elements 26 pivotally mounted within case 20 and biasing means urging said inertial elements toward an upright inverted pendulum position. The biasing means also functions to transmit reaction forces to the case and thus to the car responsive to movement of the inertial elements 26.

As shown in FIGS. 2 and 4 the inertial elements 26 include the body weights 28 with each body weight having an arm 30 extending therefrom. The pivotal mounting of elements 26 is in their arms 30 at a point between the weights 28 and the ends of arms 30 to which the pushed 32 is pivotally connected. Thus, as shown in FIG. 2, the inertial elements are mounted in an upright inverted pendulum position with the body weights 28 above their respective pivot points. The weights 28 are generally rectangular in shape from the front with the upper surface being arcuate so that it does not engage the top of the case 20 as the weights move. The arms 30 have substantial thickness as shown in FIG. 4 and are generally triangular in shape as can be seen from FIG. 2.

The case 20 includes a base 34, a back 36 integral with base 34, sides 38 and the removable cover 40 which is fastened to the sides 38 by the fastening means 42. The flanges 18 are integral with the cover 40. The primary function of the cover 40 is to secure the device to the car for transmission of reaction forces to the car. The cover 40 also protects the device to prevent loose articles in the trunk from interfering with the operation of the device.

The pivotal mounting of one of the inertial elements 26 is shown in FIG. 4. The pivotal mounting means includes the bolt 44 with the sleeve 46 thereon and washers 48 and 50 positioned on bolt 44 at each end of sleeve 46, the needle bearing 52 and the nut 54 threaded on the end of bolt 44 extending from the rear of the back 36 of case 20. The point of pivotal mounting of elements 26 is approximately at a midpoint of the arms 30 and the biasing means including the pushrod 32 is connected to the outer end of the arms 30. In this manner with proper loading of the biasing means, the inertial elements 26 are mounted in an upright inverted pendulum position with the centroid of each weight 28 being vertically above the axis of its pivotal mounting. With this mounting, the gravitational forces on the weights work with centrifugal forces and not against them as would be the case in pendulum mounting.

The pushrod 32 which may be of any suitable form is shown to be made of bar stock having a rectangular cross section. The pushrod 32 is pivotally connected to the lower portion of each of the arms 30 as shown in FIG. 4. The pivotal connecting means includes the bolt 56, the sleeve 58 and washer 60 around the bolt 56, and the needle bearing 62 mounted in the pushrod 32 and surrounding the sleeve 58. The bolt 56 is threadedly engaged in the finger 64 extending from the lower end of arm 30.

As mentioned, a biasing means is provided and such means includes the pushrod 32 and the springs 66 which are positioned between the ends of the pushrod 32 and the sided 36 of the case 20. A suitable mounting is provided on the ends of the pushrod 32 and on the sides 36 to support the springs 66 and retain them in position between the sides 36 and the ends of pushrod 32. Such mounting includes the tenons 68 and washers 70 on the ends of pushrod 32 and the tenons 72 mounted on the sides 36.

To provide an adjustment in the biasing means, one or more of the shims 74 is positioned on the tenon 72 between the end of spring 66 and side 36 as shown in FIG. 3. The shim 74 is C-shaped and capable of slipping over tenon 72. One or more of such shims 74 may be used to vary the compression of spring 66 to thereby adjust the biasing means. The use of such shims allows an adjustment to vary the response of the inertial elements to the motion of the automobile.

The transmission of forces developed in the device is through the pushrods 32 and the springs 66 to the case 20 and the automobile. When the car tends to skid to the right, the weights 28 all move to the right and the pushrod 32 moves to the left to transmit a reaction force by compression of spring 66 to the case 20. Such reaction force being in the opposite direction to the forces directed toward the outside of a turn when the automobile is turning. Thus all forces directed transversely in the automobile cause the inertial elements 26 to move and develop a reaction force in the opposite direction. Any movement of the weights in either direction from their upright inverted pendulum position and such movement causes a lowering of the weights below such position. The greater the weight movements the lower the position of the weights is to thereby cause the center of gravity of the car to be lowered.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. An automobile stabilizer comprising
   a case being adapted to be secured to an automobile,
   a plurality of inverted pendulums,
   said pendulums each having a weight, and a depending arm,
   means for pivotally mounting said pendulums to said case at a midpoint in the pendulum arms,
   means connecting the pendulum arms at points below the pivot mounting points, and means for biasing said connecting means toward a position with each of said pendulum weights being vertically above its pivot mounting point.

2. An automobile stabilizer comprising
a case having a base, sidewalls and a backwall,
a plurality of inertial elements each having a body and an arm extending therefrom,
a plurality of pins each extending through a midpoint of one of the arms and the backwall of said case to pivotally mount said inertial elements to said case,
a pushrod,
means for pivotally connecting said pushrod to the ends of said arms below said pins, and
means biasing said pushrod axially in both directions to maintain said inertial elements in an upright inverted pendulum position.

3. An automobile stabilizer according to claim 2, wherein said biasing means includes
a pair of springs, and
means for supporting said springs, one between each end of said pushrod and said sidewalls.

4. An automobile stabilizer according to claim 3, including means for adjusting the force of said springs.

5. An automobile stabilizer according to claim 3, wherein said supporting means includes
a tenon and a washer mounted on each end of said pushrod, and
a tenon extending from each of said sidewalls toward said pushrod,
said tenons having a diameter to allow the ends of said springs to be received around said tenons.

6. An automobile stabilizer according to claim 5, including
at least one C-shaped shim positioned on one of said sidewall tenons between the end of the spring and said sidewall to reduce the installed length of said spring and thereby adjust the biasing of said inertial elements.

7. An automobile stabilizer, comprising
a case having a base, a back, sides, a cover and means for securing the case to an automobile,
a plurality of weights,
each of said weights having an arm extending therefrom,
means for pivotally mounting said weight arms to said case,
a pushrod pivotally connecting the outermost ends of said arms,
said pushrod being at a level below said mounting means and said weights within said case,
means for biasing said pushrod in both directions where movement of said weights in said case is transmitted to said case to provide an oppositely directed reaction force with respect to the force responsible for the weight movement.

8. An automobile stabilizer according to claim 7, including means for adjusting the force of said biasing means.